United States Patent
Takahashi

(10) Patent No.: US 7,844,166 B2
(45) Date of Patent: Nov. 30, 2010

(54) REPRODUCTION DEVICE, VIDEO DECODING DEVICE, SYNCHRONIZATION/REPRODUCTION METHOD, PROGRAM AND RECORDING MEDIUM

(75) Inventor: Kuniaki Takahashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/922,942

(22) PCT Filed: Jun. 14, 2006

(86) PCT No.: PCT/JP2006/311921

§ 371 (c)(1),
(2), (4) Date: Mar. 16, 2009

(87) PCT Pub. No.: WO2007/004395

PCT Pub. Date: Jan. 11, 2007

(65) Prior Publication Data

US 2009/0214178 A1 Aug. 27, 2009

(30) Foreign Application Priority Data

Jul. 1, 2005 (JP) .............................. 2005-194383

(51) Int. Cl.
*H04N 7/087* (2006.01)
*H04N 7/00* (2006.01)
(52) U.S. Cl. ............................ 386/84; 386/98; 386/100
(58) Field of Classification Search .................. 386/84, 386/46, 71, 113, 124, 96, 100
See application file for complete search history.

(56) References Cited

U.S. PATENT DOCUMENTS 6,233,695 B1 * 5/2001 Ahn ........................... 713/400

(Continued)

FOREIGN PATENT DOCUMENTS

EP 0 668 700 8/1995

(Continued)

OTHER PUBLICATIONS

Lu G J et al.: "Mechanisms of MPEG Stream Synchronization", Computer Communication Review, ACM, New York, NY, US, col. 24, No. 1, Jan. 1, 1994, pp. 57-67, XP000560498 ISSN: 0146-4833.

(Continued)

*Primary Examiner*—Robert Chevalier
(74) *Attorney, Agent, or Firm*—Frommer Lawrence & Haug LLP; William S. Frommer; Paul A. Levy

(57) ABSTRACT

In a random access reproduction of a stream in which video and audio are multiplexed, it is difficult to reproduce the video and audio in synchronization. A demultiplexer (110) separate a video packet, an audio packet, and a subtitle packet from the inputted multiplexed stream and supplies them to a video decoder (130), an audio decoder (140), and a subtitle decoder (150), respectively. The video decoder (130) decodes the inputted video packets and calculates PTS of the display head picture according to the PTS of the decoded head picture acquired from the video stream. A clock control unit (120) supplies the PTS of the display head picture as a synchronization signal to the audio decoder (140) and the subtitle decoder (150). The audio decoder (140) and the subtitle decoder (150) decode an audio and a subtitle access unit having the PTS value identical to the display head PTS.

13 Claims, 7 Drawing Sheets

U.S. PATENT DOCUMENTS

2003/0128294 A1 7/2003 Lundblad et al.
2007/0092224 A1* 4/2007 Tsukagoshi et al. ........... 386/96

FOREIGN PATENT DOCUMENTS

| GB | 2 338 383 | 12/1999 |
|----|-----------|---------|
| JP | 7 284065 | 10/1995 |
| JP | 10 271457 | 10/1998 |
| JP | 11 149717 | 6/1999 |
| JP | 2001 238208 | 8/2001 |
| JP | 2001 346166 | 12/2001 |
| JP | 2002 197808 | 7/2002 |
| JP | 2004 120155 | 4/2004 |

OTHER PUBLICATIONS

Wiegand T: "Draft ITU-T Recommendation and Final Draft International Standard of Joint Video Specification (ITU-T Rec. H.264/ISO/IEC 14496-10 AVC)" Joint Video Team (JVT) of ISO/IEC MPEG & ITU-T VCEG (ISO-IEC JTC1/SC29/WG11 and ITU-T SG16 Q6), XX, XX, Apr. 2, 2003 page complete, XP002328607.

* cited by examiner

REPRODUCTION DEVICE, VIDEO DECODING DEVICE, SYNCHRONIZATION/REPRODUCTION METHOD, PROGRAM AND RECORDING MEDIUM

TECHNICAL FIELD

The present invention relates to a reproduction apparatus, a video decoding apparatus and a synchronized reproduction method for decoding a stream in which video and audio are multiplexed.

BACKGROUND ART

A media player and a personal computer that can playback high-capacity optical disc media such as a digital versatile disc (DVD) or the like are in widespread use and movie contents of high quality stored in DVDs or the like have been supplied. A DVD recorder is also widely used for recoding in DVDs the contents supplied via television broadcasts. A compression-encoding technology is essential for storing video and audio in a storage medium such as a DVD. In addition, since audio and caption need to be synchronized with video in the movie contents, a control mechanism for synchronized playback is necessary.

MPEG (Moving Picture Experts Group) and H.264/AVC (Advanced Video Coding) are standards of the moving image compression-encoding technology. The video and audio coded streams are system-multiplexed with header information such as playback time information necessary for synchronized playback and then stored in a storage medium. A program stream of a MPEG-2 system is a standard of system multiplexing technology for the use of a storage medium.

In the program stream of the MPEG-2 system, presentation time stamp (PTS) information is attached on a basis of an access unit that is a unit of playback of video and audio. The synchronized playback of the video and audio will be performed based on this PTS information.

DISCLOSURE OF THE INVENTION

Problems to be Solved by the Invention

If a multiplexed stream such as a program stream of the MPEG-2 system is not playbacked from the head but randomly accessed to playback at any intermediate picture, the synchronized playback of the video and audio could not be sometimes properly performed. Since the video stream has been possibly subjected to interframe prediction encoding at the moving image encoding process layer in which a future frame is referenced, if the playback is done at any randomly accessed point, an order of decoding the frames and an order of displaying the same will not coincide. Therefore, the PTS information obtained at the system layer upon the random access cannot be used without change as a criterion time stamp for synchronized playback of the video and audio.

It is necessary to somehow obtain the PTS information of a picture that serves as a head in the display order and to synchronize the audio and caption using the PTS information of the display head picture as a criterion. However, since the PTS information is usually only attached to a picture that serves as a random access point in order to keep the file size of the multiplexed stream small, the PTS information necessary for synchronized playback cannot be obtained at the system layer.

The present invention has been achieved in view of the foregoing problems. It is thus general purpose of the present invention to provide a reproduction apparatus, a video decoding apparatus and a synchronized reproduction method for synchronizing video and audio, when a stream in which video and audio are multiplexed is randomly accessed to playback.

Means to Solve the Problems

To solve the foregoing problems, a reproduction apparatus according to one of the embodiments of the present invention comprises: a demultiplexer which separates video data and audio data from a multiplexed stream in which a video stream and an audio stream are multiplexed; a video decoder which decodes the video data; an audio decoder which decodes the audio data; and a controller which supplies a synchronization signal for synchronizing with playback of the video to the audio decoder. The video decoder comprises a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture. The controller supplies the calculated playback time stamp of the display head picture as the synchronization signal to the audio decoder.

Another embodiment of the present invention also provides a reproduction apparatus. This apparatus comprises: a demultiplexer which separates video data, audio data and caption data from a multiplexed stream in which a video stream, an audio stream and a caption stream are multiplexed; a video decoder which decodes the video data; an audio decoder which decodes the audio data; a caption decoder which decodes the caption data; and a controller which supplies a synchronization signal for synchronizing with playback of the video to the audio decoder and the caption decoder. The video decoder comprises a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture. The controller supplies the calculated playback time stamp of the display head picture as the synchronization signal to the audio decoder and the caption decoder.

Yet another embodiment of the present invention provides a video encoding apparatus. This apparatus comprises: a decoder which decodes video data separated from a multiplexed stream in which a video stream and an audio stream; and a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture.

Yet another embodiment of the present invention provides a synchronized reproduction method. This method comprises: obtaining from a video stream a playback time stamp to specify a playback time of a decoded head picture to be first decoded, when a multiplexed stream in which the video stream and an audio stream are multiplexed is randomly accessed to playback at any picture; calculating a playback time stamp of a display head picture to be first displayed based on the playback time stamp of the decoded head picture; and decoding and playbacking the audio stream in synchronization with the calculated playback time stamp of the display head picture.

Yet another embodiment of the present invention provides a program. This program enables a computer to execute: obtaining from a video stream a playback time stamp to specify a playback time of a decoded head picture to be first decoded, when a multiplexed stream in which the video stream and an audio stream are multiplexed is randomly accessed to playback at any picture; calculating a playback time stamp of a display head picture to be first displayed based on the playback time stamp of the decoded head picture; and outputting the calculated playback time stamp of the display head picture as a synchronization signal for synchronizing playback of the audio with playback of the video.

This program may be provided as a component for an embedded device firmware for performing a basic control over hardware resources such as video and audio decoders. The firmware may be stored in a semiconductor memory such as a ROM or a flash memory inside the device. A computer readable storage medium having this program embodied therein may be provided for supplying the firmware or updating at least a part of the firmware. Alternatively, this program may be transmitted via a communication line.

It should be appreciated that any combinations of the foregoing components, and any conversions of expressions of the present invention from/into methods, apparatuses, systems, computer programs, data structures, storage media, and the like are also intended to constitute applicable embodiments of the present invention.

Advantages of the Invention

According to the present invention, video and audio and so on can be accurately synchronized when a stream in which the video and the audio and so on are multiplexed is randomly accessed to playback.

DESCRIPTION OF REFERENCE NUMERALS

10 storing buffer, 12 variable length decoder, 14 inverse quantizer, 16 inverse orthogonal transformer, 18 adder, 20 frame memory, 22 motion compensation unit, 24 frame sorting buffer, 26 D/A converter, 28 display head PTS calculator, 100 synchronized reproduction apparatus, 110 demultiplexer, 120 clock controller, 130 video decoder, 140 audio decoder, 150 caption decoder, 160 display output unit, 170 audio output unit, 200 multiplex encoding apparatus, 210 video encoder, 220 audio encoder, 230 caption encoder, 240 video packetizer, 250 audio packetizer, 260 caption packetizer, and 270 multiplexer.

BEST MODE FOR CARRYING OUT THE INVENTION

Figure 1:
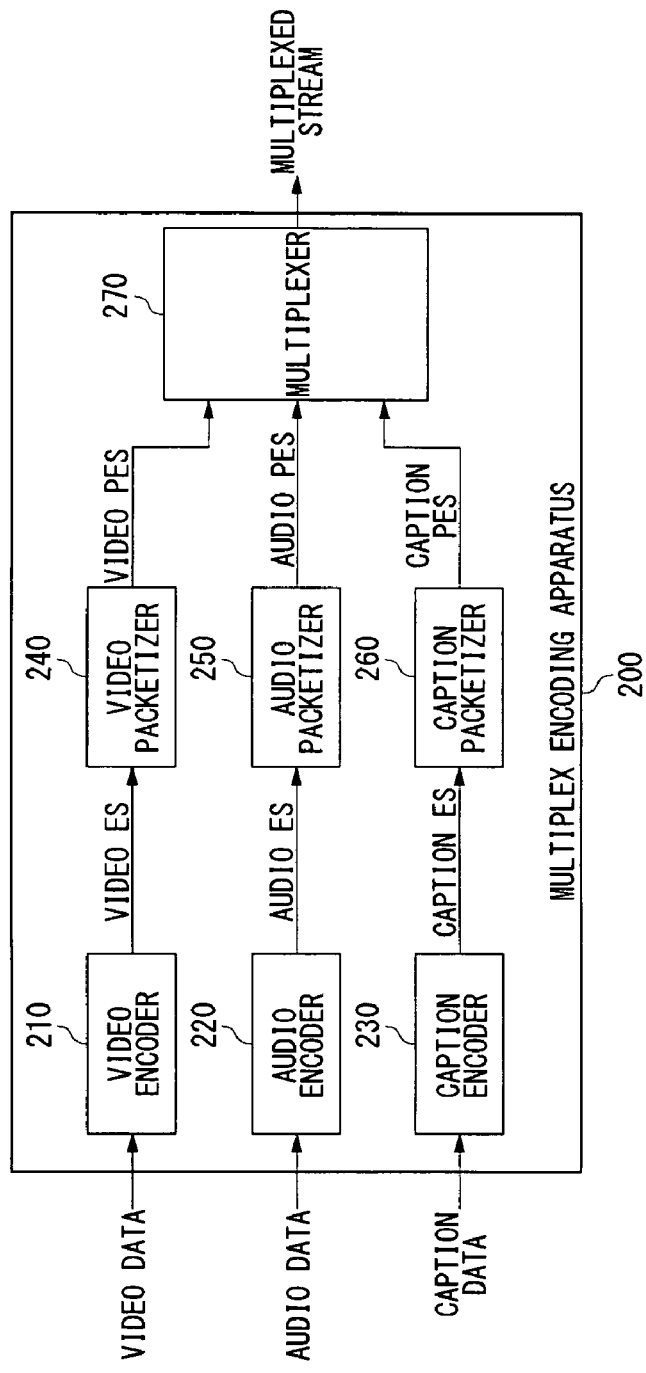
FIG. 1 is a block diagram of a multiplex encoding apparatus according to an embodiment.

FIG. 1 is a block diagram of multiplex encoding apparatus 200 according to an embodiment. The figure shows a block diagram focused on functions. These function blocks may be realized in various forms such as hardware only, software only, or a combination thereof.

The multiplex encoding apparatus 200 receives an input of video data, audio data and caption data. The audio and caption should be synchronized with the video.

The video encoder 210 encodes the input video data and generates an encoded video stream according to, for instance, the H.264/AVC standard.

The audio encoder 220 encodes the input audio data and outputs an encoded audio stream according to, for instance, the MPEG audio standard. The caption encoder 230 encodes the input caption data and outputs a coded caption stream.

The coded streams thus encoded by the video encoder 210, the audio encoder 220 and the caption encoder 230 are called elementary streams (ES).

According to the H.264/AVC standard, a layer called Network Abstraction Layer (NAL) is provided between a layer called Video Coding Layer (VCL) for performing a video encoding process and a system layer for transmitting or storing the encoded data.

The respective elementary streams of the video, audio and caption are processed on a basis of a unit called NAL unit at the layer called NAL and then mapped to the system layer for performing the transmission and/or the storage of the information.

The NAL units will be assembled into a unit called an access unit to enable an access by a unit of picture in the video stream. Likewise, the audio stream and the caption stream will be configured so that an access can be done by an access unit which is composed of the NAL units.

The multiplex encoding apparatus 200 of the present embodiment generates a multiplexed stream and stores it in a storage medium according to the program stream (PS) standard of a MPEG-2 system at the system layer. The respective streams of the video, audio and caption are packetized for multiplexing.

The video packetizer 240 packetizes the coded video stream output from the video encoder 210 into packetized elementary stream (PES) packets. Likewise, the audio packetizer 250 packetizes the coded audio stream output from the audio encoder 220 into PES packets, and the caption packetizer 260 packetizes the coded caption stream output from the caption encoder 230 into PES packets.

The multiplexer 270 multiplexes the PES packets of the video, audio and caption as a program stream of the MPEG-2 system and outputs the generated multiplexed stream. The generated multiplexed stream is recorded in a storage medium such as a DVD, a memory card or the like.

Figure 2:
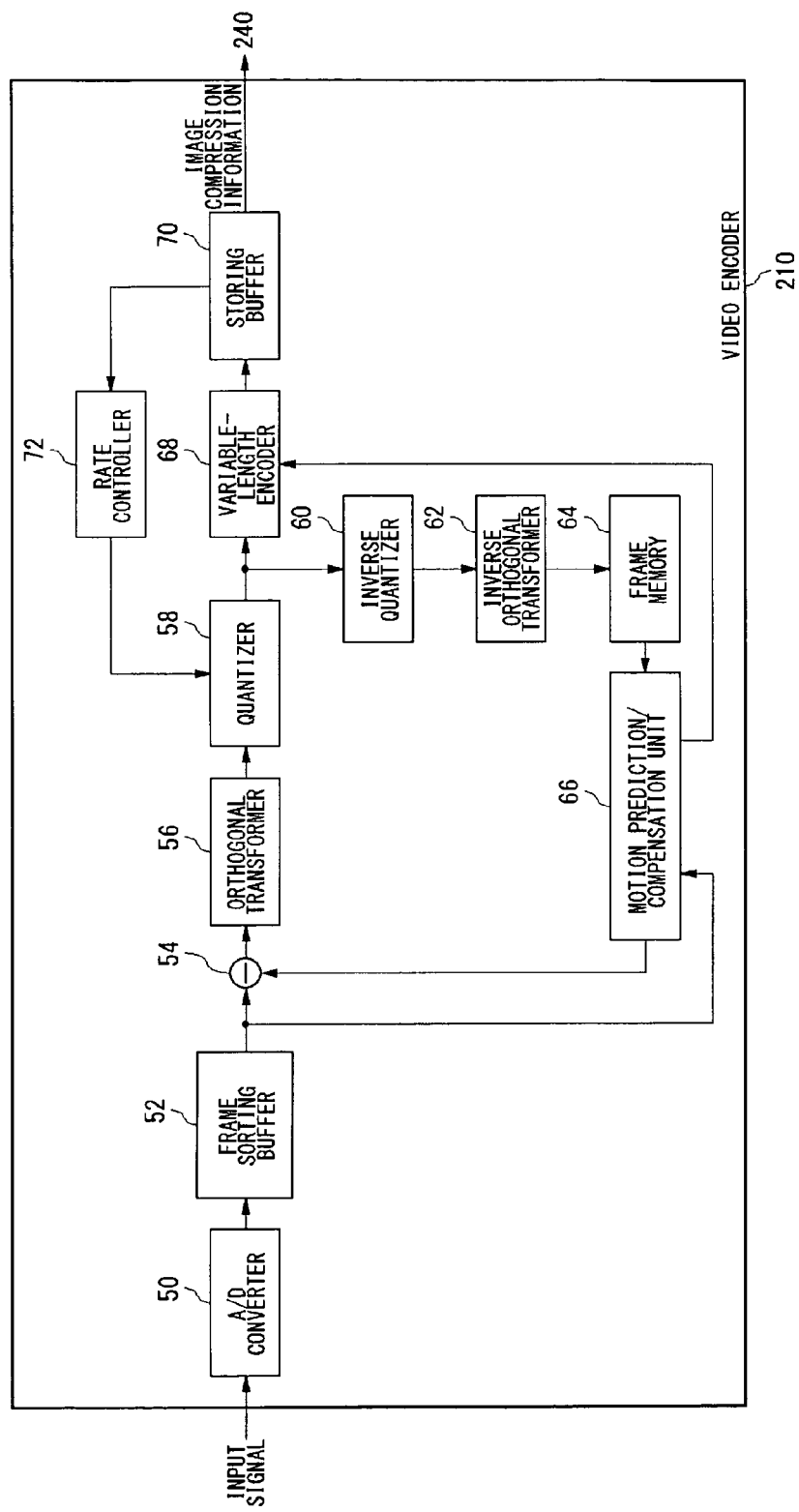
FIG. 2 is a block diagram of the video encoder of FIG. 1.

FIG. 2 is a block diagram of the video encoder 210. The video encoder 210 receives an input signal of an moving image by a unit of frame and encodes the frame images so as to output a coded stream of the moving image.

An A/D converter 50 digitizes the analog input signal and supplies the digitalized data to a frame sorting buffer 52. The frame sorting buffer 52 is a buffer for reordering and retaining the frames for interframe predictive coding. According to H.264/AVC, either a past frame or a future frame can be used as a reference image in interframe predictive coding. In addition, the number of frames available for reference images is not limited. The buffer is provided for storing the reordered frames and a reference image is appropriately supplied to a motion prediction/compensation unit 66.

Using the past or future frame(s) stored in the frame sorting buffer as the reference image(s), the motion prediction/compensation unit 66 makes motion prediction on each of macroblocks of a P frame or a B frame, thereby generating motion vectors and a motion-compensated predicted image. The motion prediction/compensation unit 66 provides the motion vectors thus generated to a variable-length encoder 68 and provides the predicted image to a differentiator 54.

If the image frame supplied from the frame sorting buffer 52 is an I frame, the differentiator 54 simply outputs the frame to an orthogonal transformer 56. If the image frame is a P/B frame, the differentiator 54 calculates a difference from the predicted image supplied from the motion prediction/compensation unit 66, and supplies the difference image to the orthogonal transformer 56.

The orthogonal transformer 56 performs discrete cosine transform (DCT) on the I frame or the difference image of the P/B frame and supplies the resultant DCT coefficients to a quantizer 58.

The quantizer 58 quantizes the DCT coefficients and supplies the resultant to the variable-length encoder 68. For the motion compensation, the quantizer 58 supplies the quantified DCT coefficients of the image frame to an inverse quantizer 60. The inverse quantizer 60 inversely quantizes the supplied quantization data, and supplies the resultant to an orthogonal inverse transformer 62. The orthogonal inverse transformer 62 performs inverse discrete cosine transform on the supplied inverse quantization data. This restores the coded image frame. The restored image frame is stored in a frame memory 64.

The motion prediction/compensation unit 66 references the reconstructed frame stored in the frame memory 64 as a frame to be encoded and makes motion compensation on the frame.

The variable-length encoder 68 performs variable-length coding on the DCT coefficients quantized by the quantizer 58 and stores the variable-length encoded and compressed image data in a storing buffer 70. For the case of the P/B frame, the variable-length encoder 68 performs variable-length coding on the quantized DCT coefficients of the difference image together with the motion vectors supplied from the motion prediction/compensation unit 66.

A rate controller 72 controls the frame rate of the frame images stored in the storing buffer 70 and adjusts the size of a quantization step to be employed in the quantizer 58. Since the frame image is variable-length encoded, the amount of each frame data is not known until the frame is actually encoded. For this reason, the rate controller 72 detects the frame rate occurring when the frame images that have been stored in the storing buffer 70 are playbacked and adjusts to an appropriate amount of coded data by increasing or decreasing the quantization step size so that the coded data can be playbacked at a certain frame rate.

The image compression information including the compressed frame images and motion vector information stored in the storing buffer 70 is output as a coded video stream and supplied to the video packetizer 240.

Figure 3:
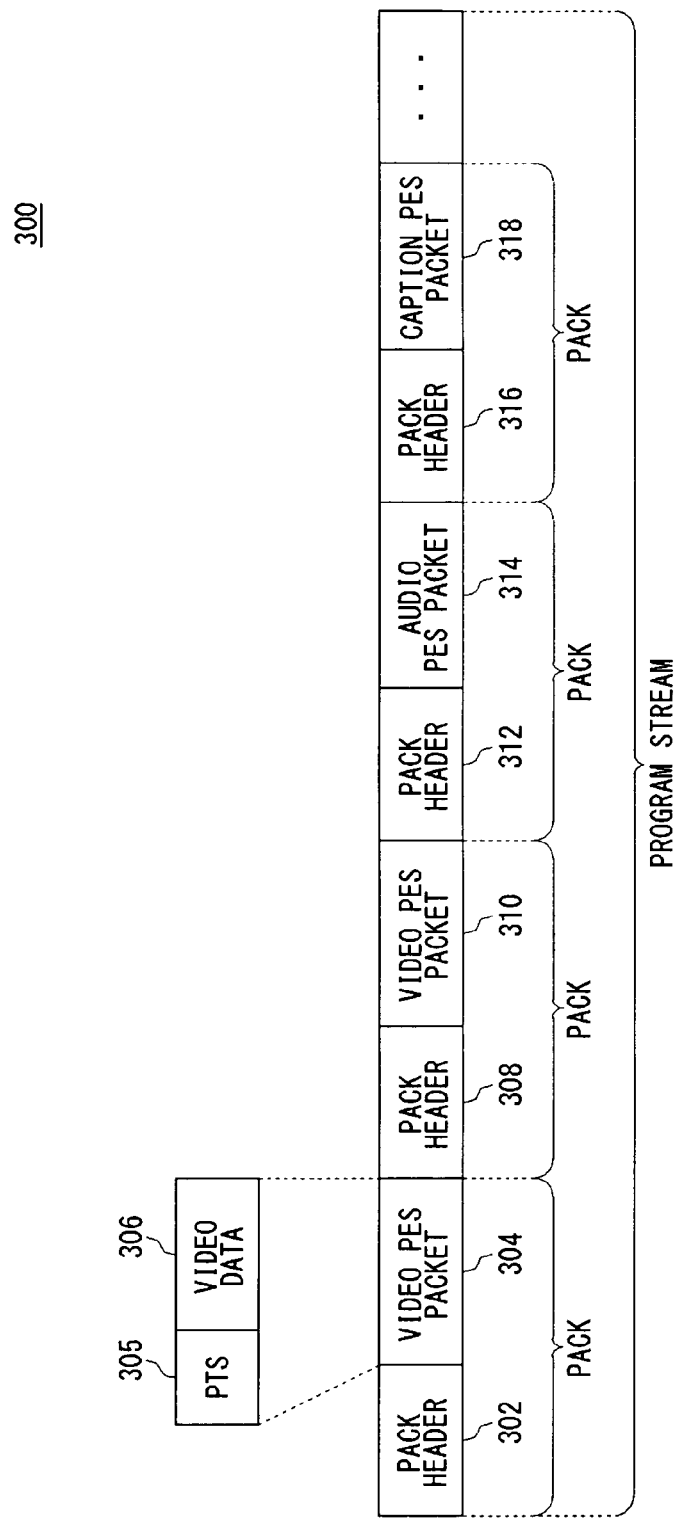
FIG. 3 is a diagram explaining a data structure of a program stream generated by the multiplex encoding apparatus of FIG. 1.

FIG. 3 is a diagram explaining a data structure of the program stream 300 generated by the multiplex encoding apparatus 200.

The program stream 300 of the MPEG-2 system is one in which the video stream, audio stream and caption stream are packetized into the PES packets and then multiplexed. A unit in which one or more PES packets are assembled is called a pack and the program stream 300 has a data structure in which the packs are sequentially arranged. Herein, a configuration is adopted in which one pack has one PES packet therein.

The head pack includes a pack header 302 and a video PES packet 304. The header of the video PES packet 304 includes PTS information 305 to provide a criterion of playback time of the video and the payload thereof includes the video data 306.

The PTS information 305 is included in the video PES packet of an access unit that is subject to random access. However, the PTS information is not included in the video PES packet of an access unit that is not subject to random access. Otherwise, the data size of the program stream 300 would grow. If it is acceptable that the data size of the program stream 300 would grow, the PTS information could be included in the header of the video packet of every access unit regardless of whether it is subject to random access or not.

The second pack includes a pack header 308 and a video PES packet 310. The third pack includes a pack header 312 and an audio PES packet 314. The fourth pack includes a pack header 316 and a caption PES packet 318. The headers of the audio PES packet 314 and the caption PES packet 318 also include, if appropriate, the PTS information to provide a criterion of playback time of the audio and the caption.

When an access unit of the video stream is randomly accessed, the PTS information 305 is retrieved from the header of the video PES packet 304 of the randomly accessed access unit.

The H.264/AVC standard defines a random access function using an instantaneous decoding refresh (IDR) picture. The IDR picture allows the subsequent pictures to be decoded without the information of pictures prior thereto and resets a buffer that has temporarily retained some reference pictures. The video encoder 210 of the multiplex encoding apparatus 200 records the PTS information for the IDR picture and obtains a PTS value from the IDR picture that is a decoded head picture, when the program stream 300 stored in a storage medium is randomly accessed.

In the program stream of the MPEG-2 system, the PTS indicating playback time is added to an access unit that is a unit for playback for each of the video, audio and caption, in order to enable synchronized playback of the video, audio and caption. If the PTS of each access unit of the video, audio and caption is synchronized with each other, the synchronized playback of the video, audio and caption can be basically achieved.

However, if the program stream is randomly accessed, the order of the pictures to be decoded from the coded video stream and the order of the pictures to be displayed do not coincide, because the video stream has been subjected to interframe prediction encoding in which a future frame is referenced. Therefore, the first picture in the decoding order will not be always the first picture in the display order. Since the PTS of the video obtained upon a random access is one obtained from the decoded head picture, it is generally different from the PTS of the first picture in the display order. If the audio and caption are synchronized in accordance with the PTS of the decoded head picture, the synchronization cannot be appropriately done if it happens that the decoded head picture is not the first picture in the display order. Therefore, the synchronized reproduction apparatus 100 of the present embodiment internally calculates the PTS of the display head picture based on the PTS of the decoded head picture.

Figure 4:
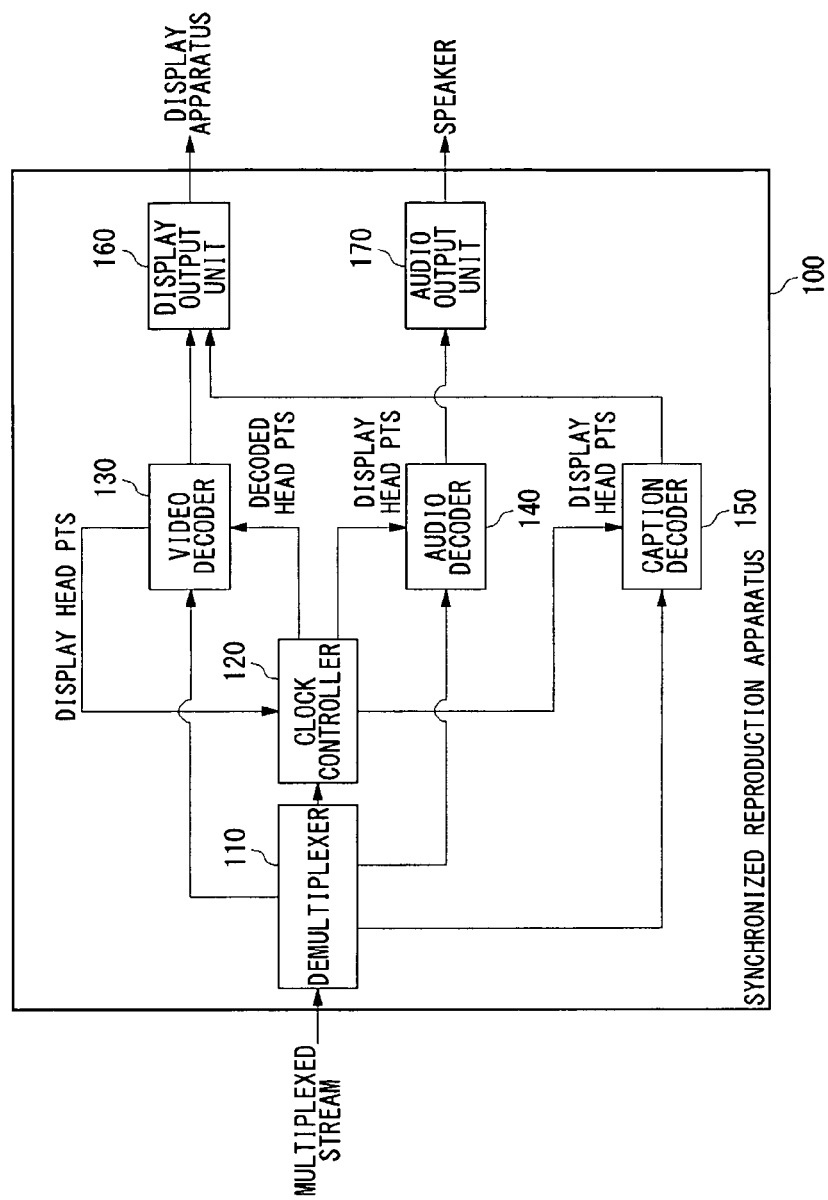
FIG. 4 is a block diagram of a synchronized reproduction apparatus according to an embodiment.

FIG. 4 is a block diagram of a synchronized reproduction apparatus 100 according to an embodiment. These function blocks may also be realized in various forms such as hardware only, software only, or a combination thereof.

The synchronized reproduction apparatus 100 receives an input of a stream in which the packets of the video, audio and caption are multiplexed and performs synchronized playback of the video, audio and caption. This multiplexed stream is one that has been generated and stored in a storage medium by the multiplexed encoding apparatus 200. The multiplexed stream is randomly accessed and the packet data of the stream is read from the random access point and input to the synchronized reproduction apparatus 100.

A demultiplexer 110 separates the video packets, audio packets and caption packets from the input multiplexed stream and provides them to a video decoder 130, an audio decoder 140 and a caption decoder 150 respectively.

The demultiplexer 110 also extracts the PTS information from the video packet at the system layer and provides the obtained PTS to a clock controller 120. This PTS is one obtained from the header of the access unit at the random access point of the video stream and it is a PTS of the decoded head picture (hereinafter, it is referred to as "decoded head PTS").

The clock controller 120 supplies a synchronization signal for synchronizing with the playback of the video to the audio decoder 140 and the caption decoder 150 and performs synchronization control. First, the clock controller 120 provides the decoded head PTS to the video decoder 130.

The video decoder 130 decodes the input video compression information and calculates a PTS of the display head picture (hereinafter, it is referred to as "display head PTS") based on the decoded head PTS. The video decoder 130 supplies the display head PTS to the clock controller 120. The video decoder 130 also supplies the decoded video data to a display output unit 160.

The clock controller 120 supplies the display head PTS given by the video decoder 130 as a synchronization signal to the audio decoder 140 and the caption decoder 150. The audio decoder 140 and the caption decoder 150 decode an audio access unit and a caption access unit that have the same PTS value as the display head PTS. Then the audio decoder 140 provides the decoded audio data to an audio output unit 170 and the caption decoder 150 provides the decoded caption data to the display output unit 160.

The display output unit 160 displays the video data and the caption data on a display apparatus and the audio output unit 170 outputs the audio data from a speaker. Since the audio data and the caption data are reproduced in synchronization with the PTS of the display head picture, the audio and caption are properly synchronized with the video.

Figure 5:
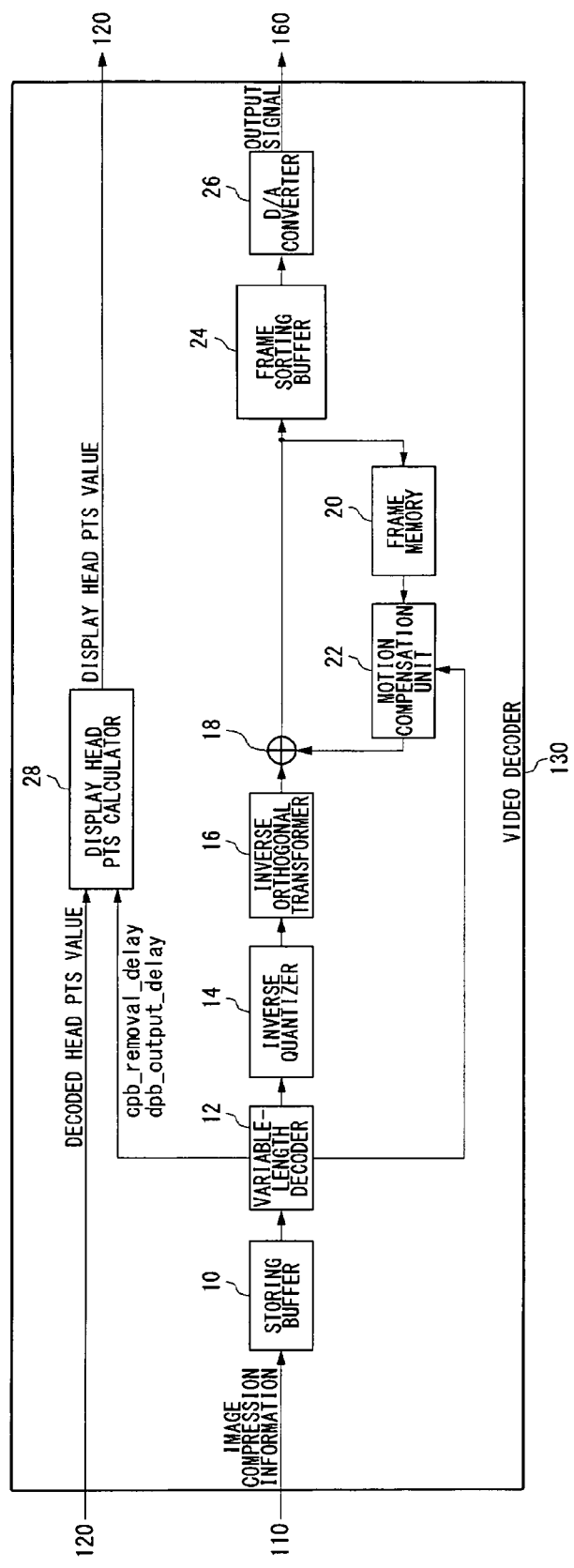
FIG. 5 is a block diagram of the video decoder of FIG. 4.

FIG. 5 is a block diagram of the video decoder 130. The video decoder 130 receives an input of image compression information including a coded video frame and motion vector information from the demultiplexer 110 and decodes the compressed image information so as to generate an output signal.

A storing buffer 10 stores the image compression information input from the demultiplexer 110. A variable-length decoder 12 performs variable decoding on the image compression information stored in the storing buffer 10, supplies the decoded image data to an inverse quantizer 14, and supplies motion vector information to a motion compensation unit 22.

The inverse quantizer 14 inversely quantizes the image data decoded by the variable-length decoder 12, and supplies the resultant to an inverse orthogonal transformer 16. The inverse orthogonal transformer 16 performs inverse discrete cosine transform (IDCT) on the DCT coefficients that are inversely quantized by the inverse quantizer 14, thereby restoring the original image data. The image data restored by the inverse orthogonal transformer 16 is supplied to an adder 18.

If the image data supplied from the inverse orthogonal transformer 16 is an I frame, the adder 18 simply stores the image data of the I frame into a frame sorting buffer 24 as well as stores it into a frame memory 20 as a reference image for generating a predicted image for a P/B frame.

If the image frame supplied from the inverse orthogonal transformer 16 is a P/B frame, i.e., a difference image, the adder 18 adds the difference image and the predicted image supplied from the motion compensation unit 22. The adder 18 thereby reconstructs the original image data and stores it in the frame sorting buffer 24.

The motion compensation unit 22 generates a predicted image for the P/B frame by using the motion vector information supplied from the variable-length decoder 12 and the reference image(s) stored in the frame memory 20. The generated predicted image is supplied to the adder 18.

The frame sorting buffer 24 is a buffer for reordering the stored frame images in the display order and the reordered frame images are supplied to a D/A converter 26. The D/A converter converts the frame image to an analog signal and outputs it to the display output unit 160.

A display head PTS calculator 28 obtains the decoded head PTS from the clock controller 120. The variable-length decoder 12 extracts the two parameters, a CPB removal delay time cpb_removal_delay and a DPB output delay time dpb_output_delay and provides them to the display head PTS calculator 28. The display head PTS calculator 28 calculates the display head PTS based on the decoded head PTS, the CPB removal delay and the DPB output delay and provides the display head PTS to the clock controller 120.

Herein, the CPB removal delay time and the DPB output delay time are syntax parameters of the video stream encoded according to the H.264/AVC standard and they are information included in the picture timing supplemental enhancement information (SEI). These parameters are defined according to a pseudo decoder model adopted in the H.264/AVC. Hereinafter, this pseudo decoder model is explained.

The video decoder 130 decodes the coded data while buffering the bit stream of the video into the storing buffer 10 and then playback the image. It is required herein that the bit stream should have been generated so as to avoid the storing buffer 10 from overflowing or underflowing. For this purpose, the behavior of the decoder is modeled using the pseudo decoder model in the H.264/AVC standard.

The pseudo decoder model defines two buffers: a coded picture buffer (CPB) and a decoded picture buffer (DPB). The CPB is a buffer for storing a bit stream that is not yet subject to decoding processing. The CPB corresponds to the storing buffer 10 of the video decoder 130 of FIG. 5. The DPB is a buffer for storing the pictures decoded by the decoder until they are displayed. The DPB corresponds to the frame sorting buffer 24 of the video decoder 130.

The data of the access units is first input to the CPB and then the data of each access unit is retrieved from the CPB at a time specified by a CPB removal time and decoded.

The decoded picture is input to the DPB at the CPB removal time and stored. The picture stored in the DPB is output from the DPB at a time specified by a DPB output time and displayed.

According to the model of the pseudo decoder, once the data of the video stream is retrieved from the CPB, the data is decoded at the same instant and input to the DPB. The DPB is used for temporarily retaining reference pictures for motion compensation, for reordering the decoded pictures in the display order and for retaining the decoded pictures until their display output time.

If the CPB removal time and the DPB output time coincide, the picture that has been retrieved from the CPB and decoded will be output without being stored in the DPB. However, if the picture is a reference picture, it will be retained in the DPB so as to be referenced for motion compensation. If the DPB output time is greater than the CPB removal time, the picture that has been retrieved from the CPB and decoded will be stored in the DPB so as to be sorted in the display order and the output of the picture will be delayed until its DPB output time.

The CPB removal time is a delay time from when the first picture starts to be decoded until when a picture is retrieved from the CPB. The DPB output delay time is a delay time from when a picture is retrieved from the CPB until the picture is output from the DPB.

Figure 6:
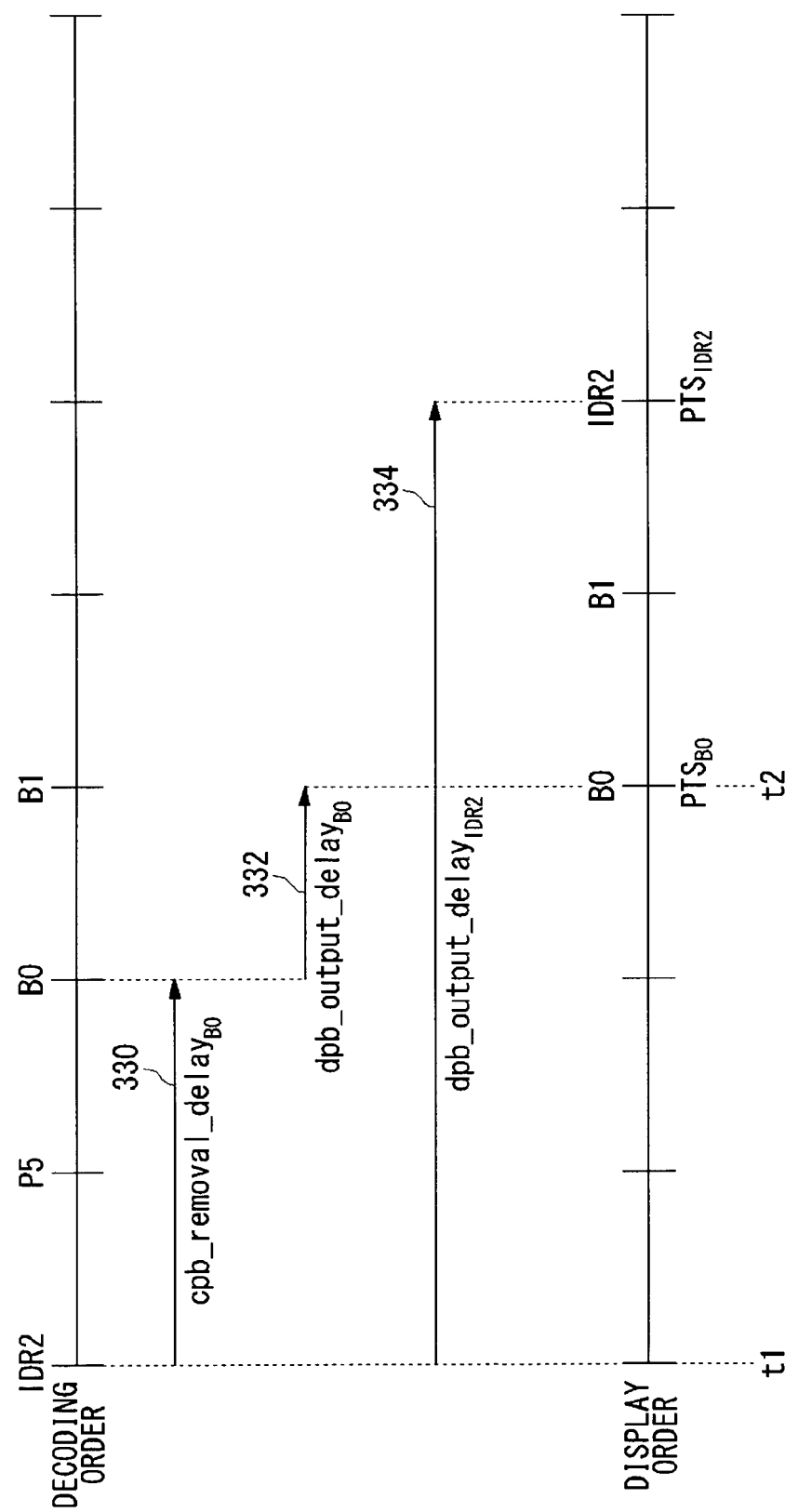
FIG. 6 is a diagram explaining a procedure for calculating a display head PTS employed by the display head PTS calculator of FIG. 5.

FIG. 6 is a diagram explaining a procedure for calculating the display head PTS employed by the display head PTS calculator 28. In the figure, the decoding order of the pictures is shown as the upper line and the display order of the pictures is shown as the lower line.

In the coded video stream, the pictures are decoded in an order of IDR2, P5, B0 and B1. IDR2 is a decoded head picture that has been randomly accessed. The symbols of IDR, P and B indicate an IDR picture, P picture, B picture respectively and the number subsequent to each symbol indicates an order of display. In other words, the pictures are displayed in an order of B0, B1 and IDR2. Herein, B0 is a display head picture.

At the time of decoding IDR2, $PTS_{IDR2}$ or the PTS value of IDR2 and $dpb\_output\_delay_{IDR2}$ or the DPB output delay time there of are obtained. Herein, $PTS_{IDR2}$ is a decoded head PTS. As indicated by numeral 334, $dpb\_output\_delay_{IDR2}$ is a delay time from when the decoded head picture IDR2 is retrieved from the CPB and starts to be decoded until when the decoded head picture IDR2 is output from the DPB.

Next, at the time of displaying the display head picture B0, $cpb\_removal\_delay_{B0}$ or the CPB removal delay time and $dpb\_output\_delay_{B0}$ or the DPB output delay time are obtained.

As indicated by numeral 330, $cpb\_removal\_delay_{B0}$ is a delay time from when the decoded head picture IDR2 is retrieved from the CPB and starts to be decoded until when the display head picture B0 is retrieved from the CPB and starts to be decoded.

As indicated by numeral 332, $dpb\_output\_delay_{B0}$ is a delay time from when the display head picture B0 is retrieved from the CPB and starts to be decoded until when the display head picture B0 is output from the DPB.

The display head PTS calculator 28 calculates $PTS_{B0}$ or the PTS value of the display head picture B0 according to the following formula.

$$PTS_{B0}=PTS_{IDR2}-(dpb\_output\_delay_{IDR2}-(cpb\_removal\_delay_{B0}+dpb\_output\_delay_{B0}))$$

As apparent from the figure, this formula shows that when $dpb\_output\_delay_{IDR2}$ or the DPB output delay time of the decoded head picture IDR2 is subtracted from $PTS_{IDR2}$ of the decoded head picture IDR2 and then $cpb\_removal\_delay_{B0}$ or the CPB removal delay time of the display head picture B0 and $dpb\_output\_delay_{B0}$ or the DPB output delay time thereof are added to the result of the subtraction, $PTS_{B0}$ of the display head picture B0 will be obtained.

Herein, the sum of $cpb\_removal\_delay_{B0}$ or the CPB removal delay time of the display head picture B0 and $dpb\_output\_delay_{B0}$ or the DPB output delay time thereof is a delay time from when the decoded head picture IDR2 is retrieved from the CPB and starts to be decoded until when the display head picture B0 is output from the DPB.

It is noted that if the display head picture coincides with the decoded head picture, the PTS value of the display head picture does not need to be calculated. It is because the PTS value of the decoded head picture can be used without change. It cannot be determined until the decoding processing proceeds that the decoded head picture becomes a display head picture, however, if the first picture that has been displayed has a PTS value, it means that the picture is also a decoded head picture and the PTS value of the decoded head picture can be used without change. Thereby, if the display head picture coincides with the decoded head picture, the calculation of the display head PTS can be omitted and the processing cost can be reduced.

Figure 7:
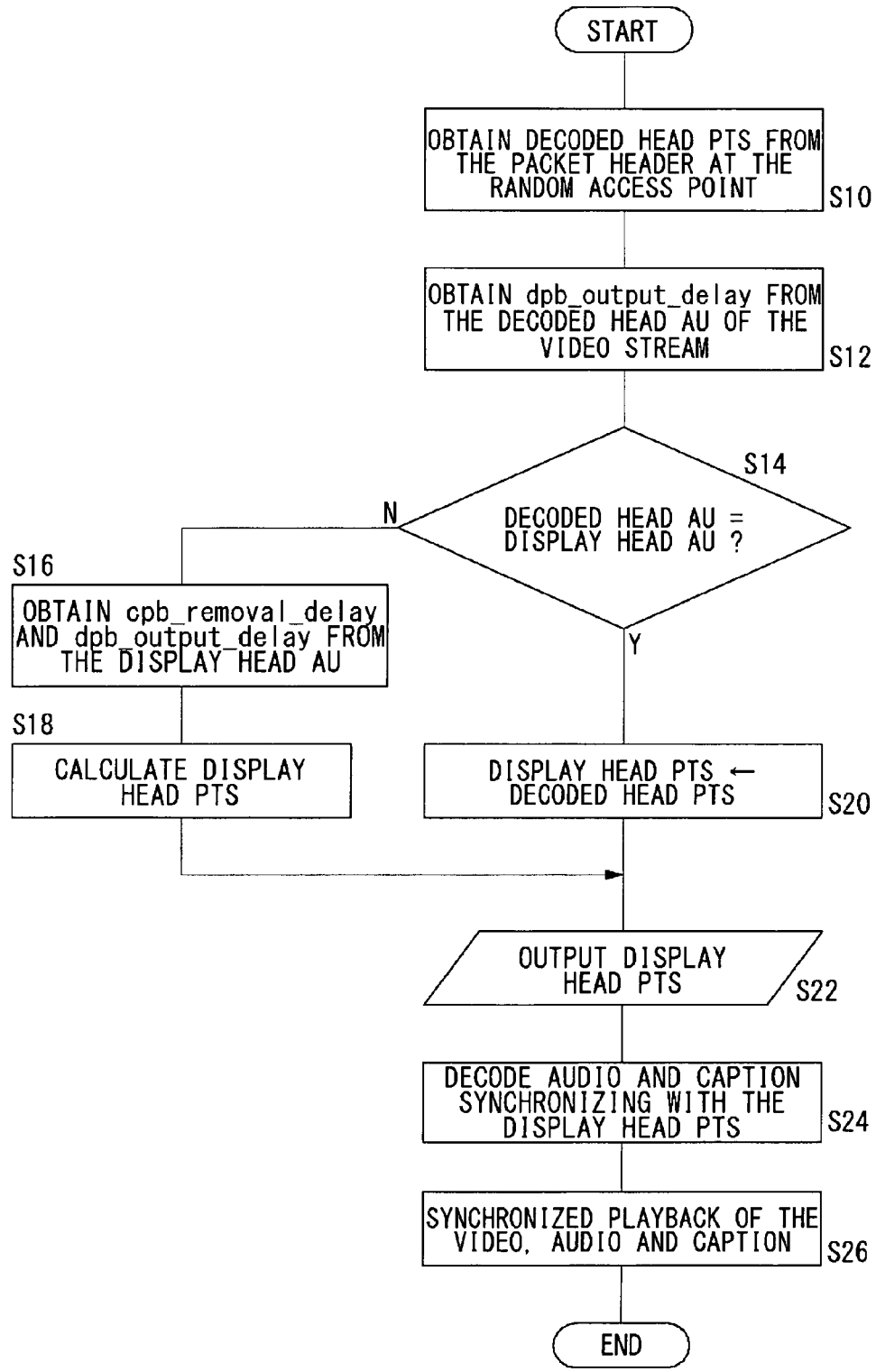
FIG. 7 is a flowchart explaining the synchronized playback process employed by the synchronized reproduction apparatus of FIG. 4.

FIG. 7 is a flowchart explaining the procedure for the synchronized playback process employed by the synchronized reproduction apparatus 100.

The clock controller 120 obtains the decoded head PTS from the packet header at the random access point in the coded video stream separated by the demultiplexer 110 and provides it to the video decoder 130 (S10).

In the video decoder 130, the display head PTS calculator 28 obtains the DPB output delay time dpb_output_delay from the decoded head access unit of the video stream decoded by the variable-length decoder 12 (S12).

When the first picture is displayed, the display head PTS calculator 28 determines whether or not the decoded head access unit and the display head access unit coincide (S14). If the decoded head access unit and the display head access unit coincide (Y of S14), the value of the decoded head PTS is input into a variable for retaining the display head PTS (S20).

If the decoded head access unit and the display head access unit do not coincide (N of S14), the display head PTS calculator 28 obtains the CPB removal delay time cpb_removal_delay and the DPB output delay time dpb_output_delay from the display head access unit (S16).

The display head PTS calculator 28 subtracts the DPB output delay time dpb_output_delay of the decoded head access unit from the decoded head PTS and adds the CPB removal delay time cpb_removal_delay and the DPB output delay time dpb_output_delay of the display head access unit to the result of the subtraction so as to calculate the display head PTS (S18).

The display head PTS calculator 28 outputs the display head PTS obtained at Step S20 or Step S18 and gives it to the clock controller 120 (S22).

The clock controller 120 provides the display head PTS obtained from the video decoder 130 to the audio decoder 140 and the caption decoder 150, and the audio decoder 140 and the caption decoder 150 respectively decode the audio and the caption that synchronize with the display head PTS of the video (S24).

Receiving the decoded results from the video decoder 130, the audio decoder 140 and the caption decoder 150, the display output unit 160 and the audio output unit 170 playback the video, audio and caption in a synchronized manner (S26).

According to the synchronized reproduction apparatus 100 of the present invention as described, the PTS value of the decoded head picture can be obtained at a system layer and the PTS value of the display head picture can be obtained by calculation with reference to the CPB removal delay time and the DPB output delay time that are parameters of the video stream. Thereby, the playback of the audio and caption can be performed by using the PTS value of the display head picture as a criterion and therefore the playback of the audio and caption can be accurately synchronized with the playback of the video.

Since the PTS value of the display head picture can be obtained by calculation, all pictures do not have to have the PTS information therein and it will be sufficient that only pictures at the random access points have the PTS information. This reduces the overhead at the system layer and lessens a burden for synchronization control.

The present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention. Hereinafter, such modifications will be explained.

In the above-mentioned embodiment, the video stream and the audio stream are multiplexed at a system layer by using a program stream of the MPEG-2 system so as to generate a multiplexed stream for a storage use. However, any other standard than the MPEG-2 system can be used at the system layer. For instance, the video and audio may be multiplexed in accordance with H.264/AVC file formats. Furthermore, in respect to VCL layer, the moving image encoding is performed by H.264/AVC in the embodiment, however, any other standard than H.264/AVC can be used as long as the standard allows the parameters necessary for calculating the display head PTS based on the decoded head PTS to be obtained from the video stream.

In the above-mentioned embodiment, a procedure is explained for calculating the display head PTS based on the decoded head PTS of the video when a multiplexed stream stored in a storage medium is randomly accessed. This procedure can be also applied to a situation where a broadcast program is watched starting from a halfway point in a broadcast multiplexed stream. When the broadcast program is watched starting from a halfway point, it will happens that the decoded head picture does not coincide with the display head picture. Therefore, the audio and caption has to be synchronized with the calculated PTS of the display head picture. The synchronization control of the present invention can be thus applied not only to a multiplexed stream for a storage use but also to a multiplexed stream for the use of transmission media in which the stream is transmitted by a transport stream of the MPEG-2 system, real-time transport protocol (RTP) or the like.

INDUSTRIAL APPLICABILITY

The present invention is applicable to a filed of moving image reproduction processing.

What is claimed is:

1. A reproduction apparatus comprising:
a demultiplexer which separates video data and audio data from a multiplexed stream in which a video stream and an audio stream are multiplexed;
a video decoder which decodes the video data;
an audio decoder which decodes the audio data; and
a controller which supplies a synchronization signal for synchronizing with playback of the video to the audio decoder,
wherein the video decoder comprises a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture; and
wherein the controller supplies the calculated playback time stamp of the display head picture as the synchronization signal to the audio decoder.

2. The reproduction apparatus of claim 1, wherein the time stamp calculator obtains from the video stream a parameter related to delay for displaying the decoded head picture and a parameter related to delay for displaying for the display head picture and then calculates the playback time stamp of the display head picture based on the playback time stamp of the decoded head picture using the parameters related to the delay for displaying.

3. The reproduction apparatus of claim 2, wherein the parameter related to the delay for displaying the decoded head picture indicates a delay time from when the decoded head picture starts to be decoded until the decoded head picture is displayed.

4. The reproduction apparatus of claim 2, wherein the parameter related to the delay for displaying the display head picture indicates a delay time from when the decoded head picture starts to be decoded until the display head picture is displayed.

5. The reproduction apparatus of claim 2, wherein the parameter related to the delay for displaying the display head picture indicates a delay time from when the decoded head picture starts to be decoded until the display head picture starts to be decoded and a delay time from when the display head picture starts to be decoded until the display head picture is displayed.

6. The reproduction apparatus of claim 4, wherein the time stamp calculator subtracts from the playback time stamp of the decoded head picture the delay time from when the decoded head picture starts to be decoded until the decoded head picture is displayed and adds to the result of the subtraction the delay time from when the decoded head picture starts to be decoded until the display head picture is displayed so as to calculate the playback time stamp of the display head picture.

7. The reproduction apparatus of claim 1, wherein if the decoded head picture is different from the display head picture, the time stamp calculator calculates the playback time stamp of the display head picture, and
wherein if the decoded head picture coincides with the display head picture, the time stamp calculator supplies to the controller the playback time stamp of the decoded head picture without change as the playback time stamp of the display head picture.

8. A reproduction apparatus comprising:
a demultiplexer which separates video data, audio data and caption data from a multiplexed stream in which a video stream, an audio stream and a caption stream are multiplexed;
a video decoder which decodes the video data;
an audio decoder which decodes the audio data;
a caption decoder which decodes the caption data; and
a controller which supplies a synchronization signal for synchronizing with playback of the video to the audio decoder and the caption decoder,
wherein the video decoder comprises a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture; and wherein the controller supplies the calculated playback time stamp of the display head picture as the synchronization signal to the audio decoder and the caption decoder.

9. The reproduction apparatus of claim 8, wherein the time stamp calculator obtains from the video stream a parameter related to delay for displaying the decoded head picture and a parameter related to delay for displaying for the display head picture and then calculates the playback time stamp of the display head picture based on the playback time stamp of the decoded head picture using the parameters related to the delay.

10. A video decoding apparatus comprising:
a decoder which decodes video data separated from a multiplexed stream in which a video stream and an audio stream; and
a time stamp calculator which when the multiplexed stream is randomly accessed to playback at any picture, obtains from the video stream a playback time stamp to specify a playback time of a decoded head picture to be first decoded and then calculates a playback time stamp of a display head picture to be first displayed based on the playback time stamp of the decoded head picture.

11. The video decoding apparatus of claim 10, wherein the time stamp calculator obtains from the video stream a parameter related to delay for displaying the decoded head picture and a parameter related to delay for displaying for the display head picture and then calculates the playback time stamp of the display head picture based on the playback time stamp of the decoded head picture using the parameters related to the delay.

12. A synchronized reproduction method comprising:
obtaining from a video stream a playback time stamp to specify a playback time of a decoded head picture to be first decoded, when a multiplexed stream in which the video stream and an audio stream are multiplexed is randomly accessed to playback at any picture;
calculating a playback time stamp of a display head picture to be first displayed based on the playback time stamp of the decoded head picture; and
decoding and playbacking the audio stream in synchronization with the calculated playback time stamp of the display head picture.

13. A non-transitory computer-readable storage medium storing a computer-readable program which enables a computer to execute:
obtaining from a video stream a playback time stamp to specify a playback time of a decoded head picture to be first decoded, when a multiplexed stream in which the video stream and an audio stream are multiplexed is randomly accessed to playback at any picture;
calculating a playback time stamp of a display head picture to be first displayed based on the playback time stamp of the decoded head picture; and
outputting the calculated playback time stamp of the display head picture as a synchronization signal for synchronizing playback of the audio with playback of the video.

* * * * *